United States Patent
Maekawa

(10) Patent No.: US 11,366,619 B2
(45) Date of Patent: Jun. 21, 2022

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Takao Maekawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/148,719

(22) Filed: Jan. 14, 2021

(65) Prior Publication Data

US 2022/0011984 A1    Jan. 13, 2022

(30) Foreign Application Priority Data

Jul. 8, 2020  (JP) .............................. JP2020-117481

(51) Int. Cl.
G06F 3/12  (2006.01)

(52) U.S. Cl.
CPC .......... G06F 3/1204 (2013.01); G06F 3/1264 (2013.01); G06F 3/1284 (2013.01); G06F 3/1286 (2013.01)

(58) Field of Classification Search
None
See application file for complete search history.

(56) References Cited

U.S. PATENT DOCUMENTS

| | | | | |
|---|---|---|---|---|
| 2004/0257921 A1* | 12/2004 | Nishimura | ............ | G06F 3/0362 369/30.08 |
| 2006/0139661 A1* | 6/2006 | Kumashio | ............. | G06F 3/1264 358/448 |
| 2014/0188803 A1* | 7/2014 | James | ................... | G06F 16/178 707/638 |

FOREIGN PATENT DOCUMENTS

JP        4769556 B2    9/2011

* cited by examiner

*Primary Examiner* — Frantz Bataille
(74) *Attorney, Agent, or Firm* — Oliff PLC

(57) ABSTRACT

An information processing device includes: a processor configured to: acquire (i) names of items whose set values have been changed from a setting screen and (ii) changed set values of the items; display, on a file name setting screen, one or more user-operable elements each corresponding to a respective one of the items whose set values have been changed; and in response to a user instruction, create a file name that includes (i) a name of at least one of the items and (ii) the set value of the at least one of the items, in which the file name is created in accordance with an arranged order of the elements displayed on the file name setting screen.

13 Claims, 11 Drawing Sheets

FIG. 4A
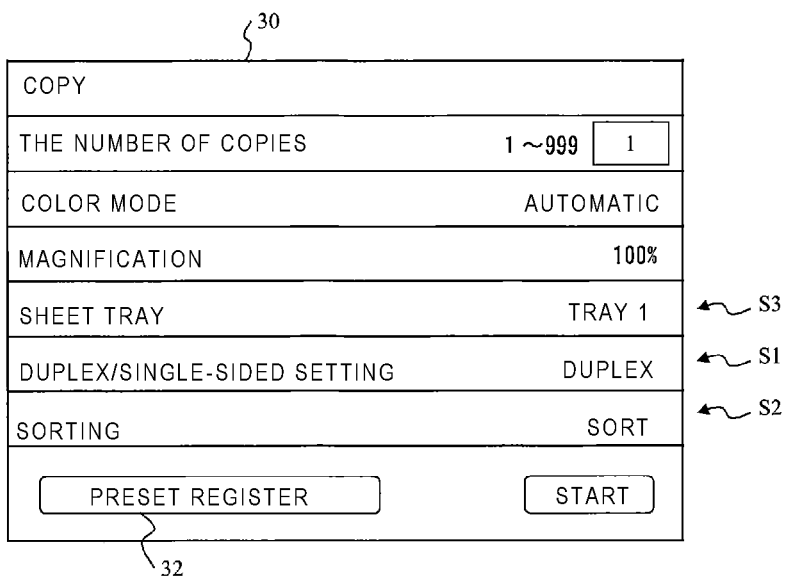
FIG. 4B
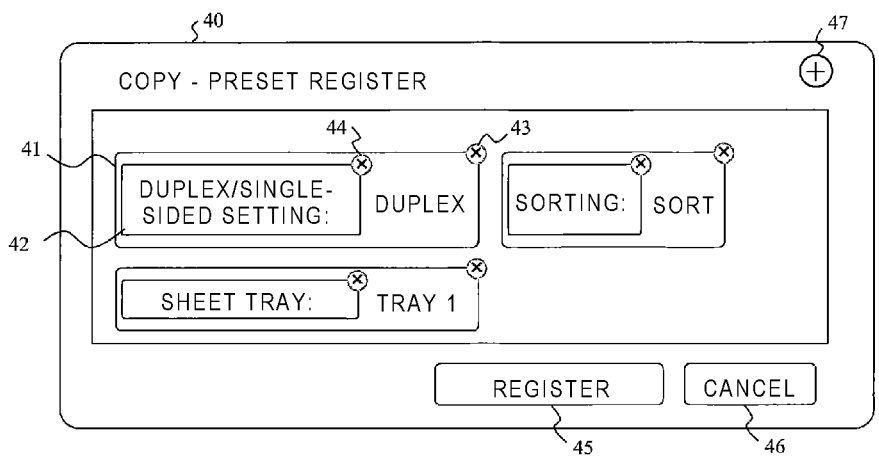
FIG. 4C
FILE NAME:
DUPLEX/SINGLE-SIDED SETTING: DUPLEX SORTING: SORT SHEET TRAY: TRAY 1

FIG. 5A
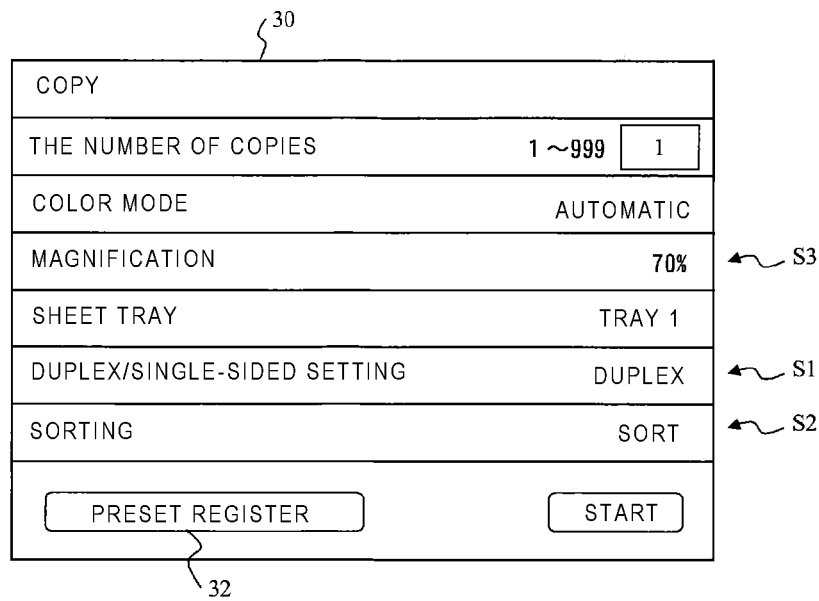
FIG. 5B
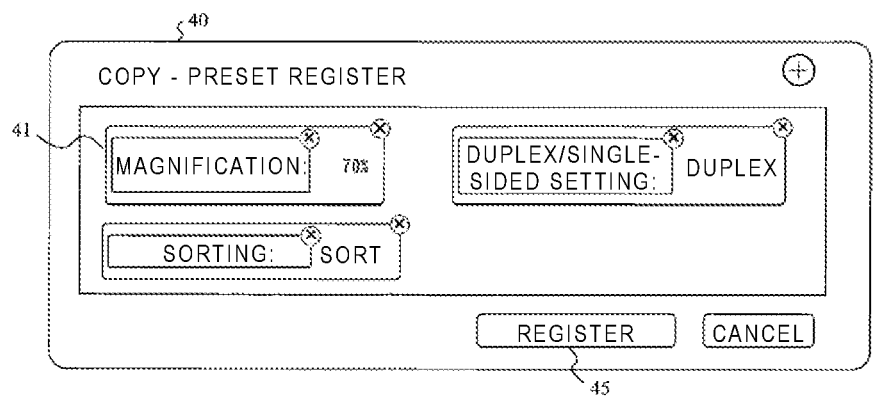
FIG. 5C
FILE NAME:
MAGNIFICATION: 70% DUPLEX/SINGLE-SIDED SETTING: DUPLEX SORTING: SORT FIG. 6A
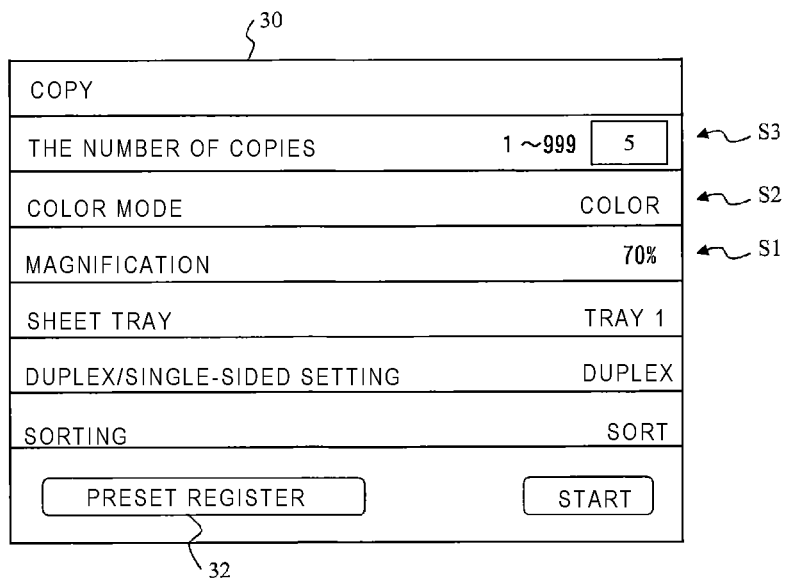
FIG. 6B
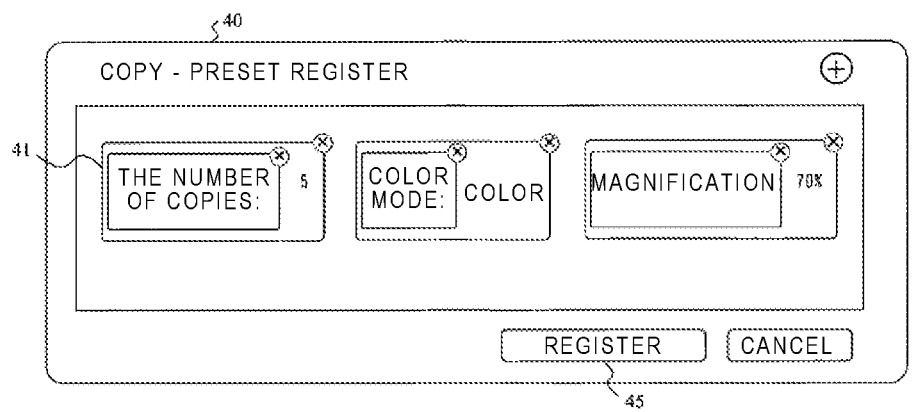
FIG. 6C
FILE NAME:
THE NUMBER OF COPIES: 5 COLOR MODE: COLOR MAGNIFICATION: 70%

FIG. 7A
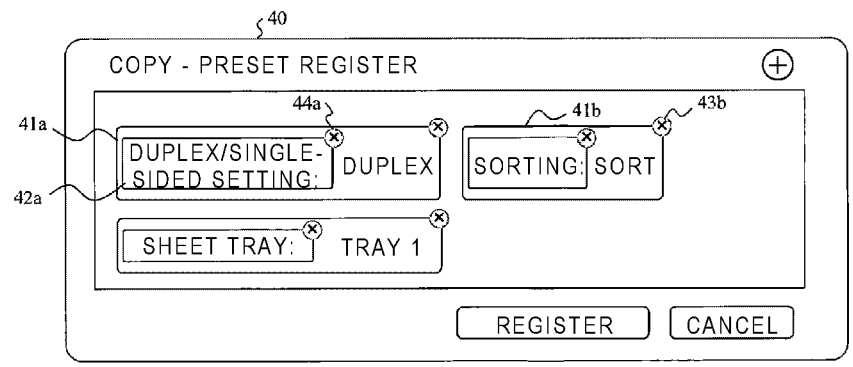
FIG. 7B
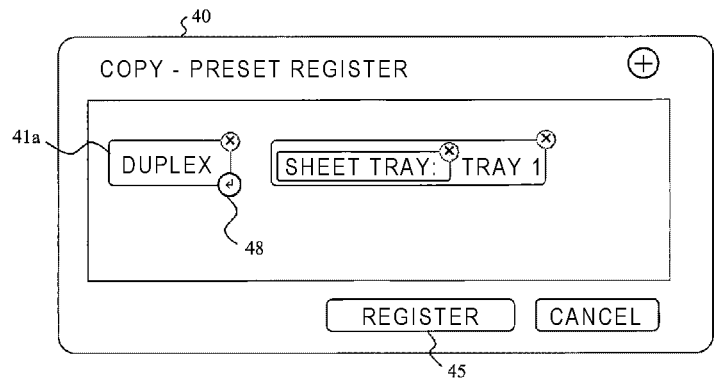
FIG. 7C
FILE NAME:
DUPLEX SHEET TRAY: TRAY 1

FIG. 8A
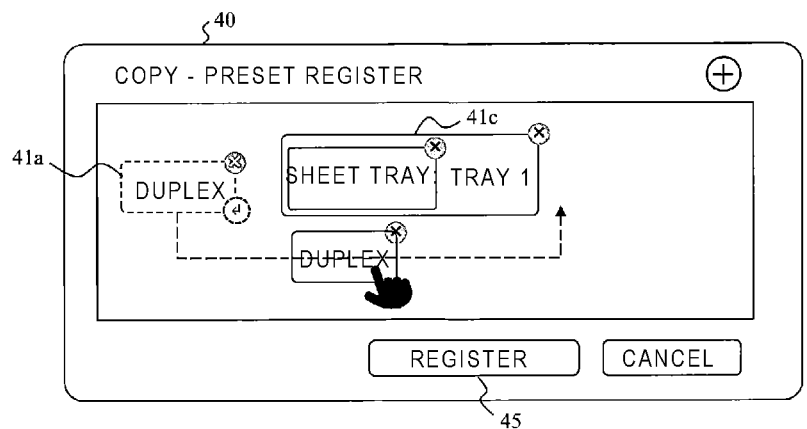
FIG. 8B
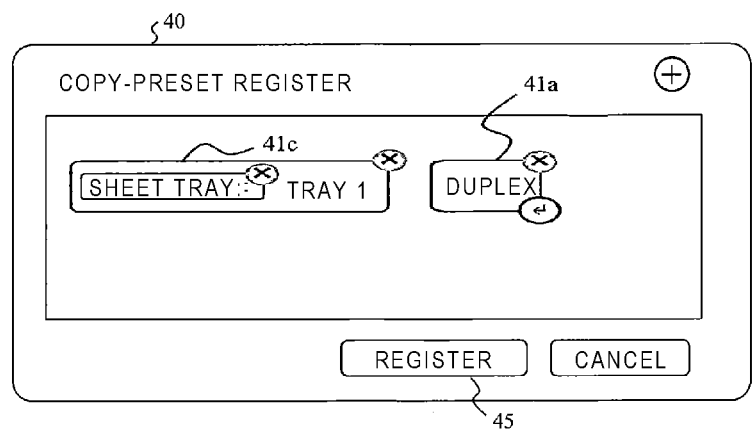
FIG. 8C
FILE NAME:
SHEET TRAY: TRAY 1 DUPLEX FIG. 9A
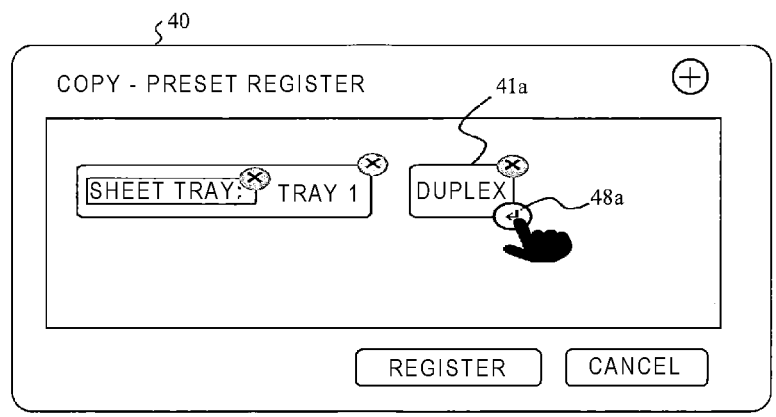
FIG. 9B
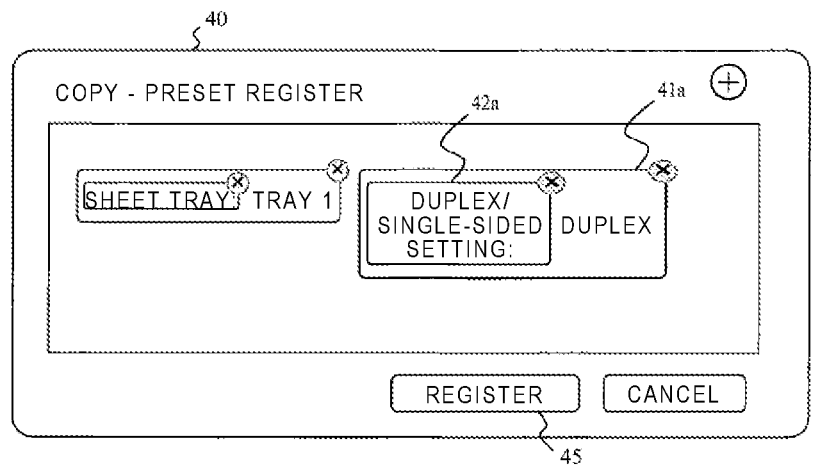
FIG. 9C FIG. 10A
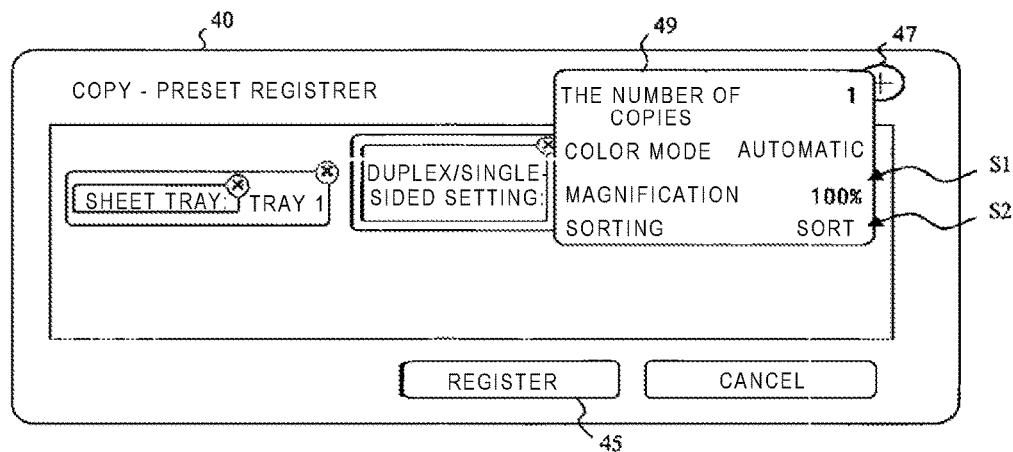
FIG. 10B
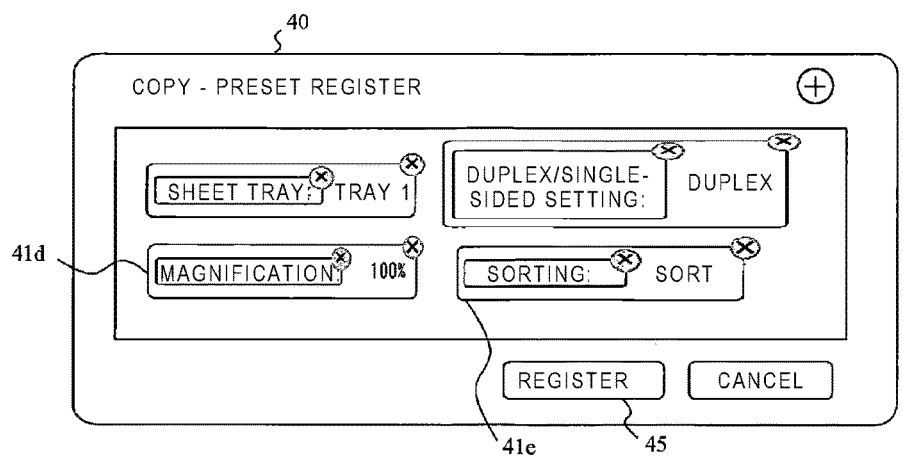
FIG. 10C
FILE NAME:
SHEET TRAY: TRAY 1 DUPLEX/SINGLE-SIDED SETTING: DUPLEX MAGNIFICATION: 100% SORTING: SORT

FIG. 12D
FILE NAME:
DUPLEX/SINGLE-SIDED SETTING: DUPLEX FX0123 SORTING: SORT SHEET TRAY: TRAY 1
FIG. 13
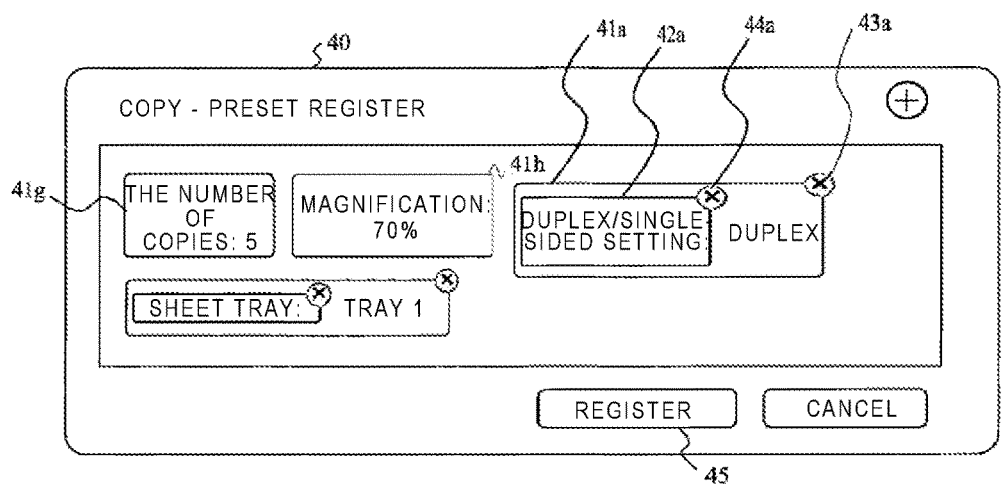
FIG. 14
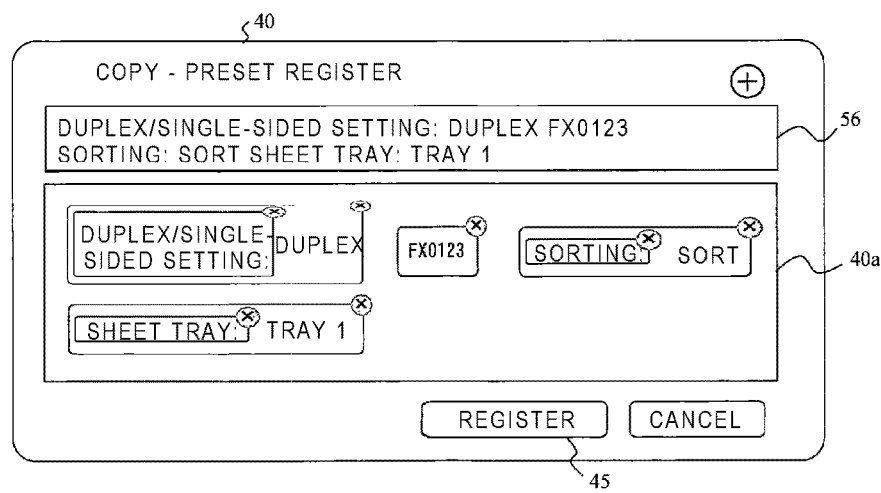

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-117481 filed Jul. 8, 2020.

BACKGROUND

(i) Technical Field

The present disclosure relates to an information processing device and a non-transitory computer readable medium.

(ii) Related Art

Proposed is a technique in which in setting of an image processing function, a set function name and setting contents are generated as a character string, and when a file name of a file in which the setting contents are to be registered is input, the generated character string is displayed as an initial name of the file name (for example, JP-B 4769556).

SUMMARY

When the presented file name is edited, an operation on the character string, that is, an operation such as inputting or deleting a character string may be troublesome.

Aspects of non-limiting embodiments of the present disclosure relate to a user interface that is simpler as compared with a case where a file name including a character string representing names of items and set values of the items is created by editing the character string.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a processor configured to: acquire (i) names of items whose set values have been changed from a setting screen and (ii) changed set values of the items; display, on a file name setting screen, one or more user-operable elements each corresponding to a respective one of the items whose set values have been changed; and in response to a user instruction, create a file name that includes (i) a name of at least one of the items and (ii) the set value of the at least one of the items, in which the file name is created in accordance with an arranged order of the elements displayed on the file name setting screen.

BRIEF DESCRIPTION OF THE DRAWINGS

Exemplary embodiment(s) of the present disclosure will be described in detail based on the following figures, wherein:

FIG. 4A is a diagram showing a display example of the setting change screen after a set value is changed, according to the present exemplary embodiment;

FIG. 4B is a diagram showing a display example of a file name setting screen to which an operation panel transitions from the setting change screen shown in FIG. 4A;

FIG. 4C is a diagram showing an example of a file name created according to settings on the file name setting screen shown in FIG. 4B;

FIG. 5A is a diagram showing another display example of the setting change screen after the set value is changed, according to the present exemplary embodiment;

FIG. 5B is a diagram showing a display example of the file name setting screen to which the operation panel transitions from the setting change screen shown in FIG. 5A;

FIG. 5C is a diagram showing an example of the file name created according to settings on the file name setting screen shown in FIG. 5B;

FIG. 6A is a diagram showing further another display example of the setting change screen after the set value is changed, according to the present exemplary embodiment;

FIG. 6B is a diagram showing a display example of the file name setting screen to which the operation panel transitions from the setting change screen shown in FIG. 6A;

FIG. 6C is a diagram showing an example of the file name created according to settings on the file name setting screen shown in FIG. 6B;

FIG. 7A is a diagram showing a display example of the file name setting screen according to the present exemplary embodiment;

FIG. 7B is a diagram showing a display example of the file name setting screen after a delete button of an item name button is selected on the file name setting screen shown in FIG. 7A;

FIG. 7C is a diagram showing an example of the file name created according to settings on the file name setting screen shown in FIG. 7B;

FIG. 8A is a diagram showing a display example of the file name setting screen according to the present exemplary embodiment;

FIG. 8B is a diagram showing a display example of the file name setting screen after an item button is moved on the file name setting screen shown in FIG. 8A;

FIG. 8C is a diagram showing an example of the file name created according to settings on the file name setting screen shown in FIG. 8B;

FIG. 9A is a diagram showing a display example of the file name setting screen according to the present exemplary embodiment;

FIG. 9B is a diagram showing a display example of the file name setting screen after the item name button is restored on the file name setting screen shown in FIG. 9A;

FIG. 9C is a diagram showing an example of the file name created according to settings on the file name setting screen shown in FIG. 9B;

FIG. 10A is a diagram showing a display example of an item addition screen according to the present exemplary embodiment;

FIG. 10B is a diagram showing a display example of the file name setting screen after an item is added by operating the item addition screen shown in FIG. 10A;

FIG. 10C is a diagram showing an example of the file name created according to settings on the file name setting screen shown in FIG. 10B;

FIG. 12D is a diagram showing an example of the file name created according to settings on the file name setting screen shown in FIG. 12C;

FIG. 13 is a diagram showing a display example of the file name setting screen according to the present exemplary embodiment; and FIG. 14 is a diagram showing another display example of the file name setting screen according to the present exemplary embodiment.

DETAILED DESCRIPTION

Hereinafter, exemplary embodiments of the present disclosure will be described based on the accompanying drawings.

Figure 1:
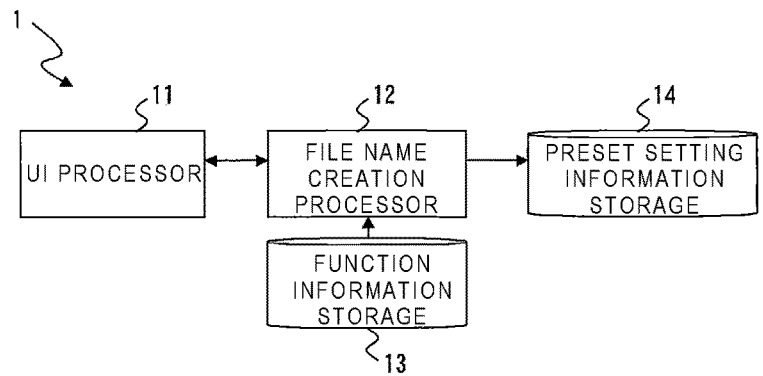
FIG. 1 is a block configuration diagram showing an information processing device according to an exemplary embodiment.
Figure 2:
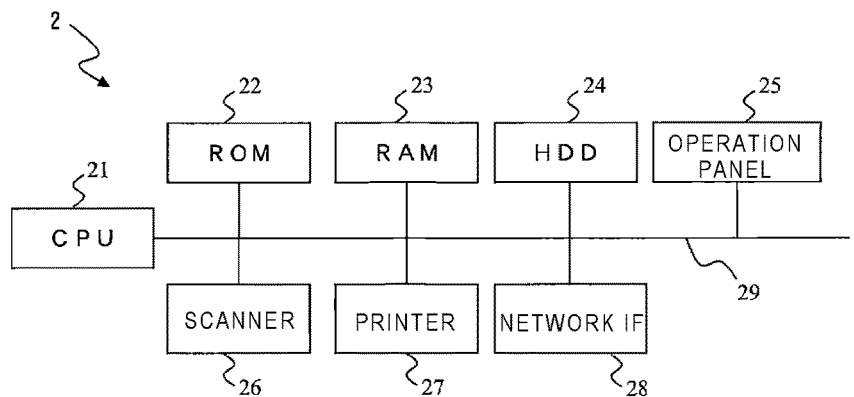
FIG. 2 is a hardware configuration diagram of an image forming apparatus according to the present exemplary embodiment.

FIG. 1 is a block configuration diagram showing an information processing device 1 according to the present exemplary embodiment. FIG. 2 is a hardware configuration diagram of an image forming apparatus 2 on which the information processing device is mounted. The image forming apparatus 2 is a multifunction machine having various functions such as a copy function, a print function, and a scanner function. The image forming apparatus 2 is an apparatus on which a computer, that is, the information processing device 1 according to the present exemplary embodiment is mounted. In FIG. 2, various programs related to control of the apparatus, transmission and reception of electronic data, and the like are stored in a ROM 22. A CPU 21 controls operations of various mechanisms mounted on the apparatus, such as a scanner 26 and a printer 27, according to the programs stored in the ROM 22. A RAM 23 is used as a work memory in execution of a program and or as a communication buffer in transmission and reception of the electronic data. A hard disk drive (HDD) 24 stores an electronic document that is read using the scanner 26. An operation panel 25 receives an instruction from a user and displays information. The scanner 26 reads an original document placed by the user and stores the read document in the HDD 24 as electronic data. The printer 27 prints an image on an output sheet according to an instruction from a control program executed by the CPU 21. A network interface (IF) 28 is used for connecting to a network, transmitting and receiving the electronic data to and from an external device, and accessing the apparatus via a browser. An address data bus 29 is connected to various mechanisms to be controlled by the CPU 21, to communicate data.

The image forming apparatus 2 provides various image processing functions such as the copy function and the print function as described above. For example, when using the copy function, the user sets various attribute items related to copying from a predetermined screen displayed on the operation panel 25. Typical attribute items of the copy function include, for example, the number of copies, single-sided or duplex printing, monochrome or color printing, and scaling size. Then, the user sets an item value for each attribute item. In general, an initial value is set in the attribute item. The user sets a desired item value by changing the initial value from a screen prepared by the image forming apparatus 2. It may be possible to change the initial value or a value already set in the present exemplary embodiment from various screens. However, in the present exemplary embodiment, a screen that allows changing of the set value will be referred to as a "setting change screen". In the following description, the attribute item will be simply referred to as an "item", and a value set for the item will be referred to as the "set value" or the "item value". The information processing device 1 is mounted on the image forming apparatus 2 and provides various functions to be described later. Thus, in the present exemplary embodiment, the information processing device 1 and the image forming apparatus 2 are substantially synonymous.

Referring back to FIG. 1, the information processing device 1 according to the present exemplary embodiment includes a user interface (UI) processor 11, a file name creation processor 12, a function information storage 13, and a preset setting information storage 14. Components not used in the description of the present exemplary embodiment will be omitted in the drawings.

The user interface processor 11 causes the operation panel 25 to function. That is, the user interface processor 11 functions as (i) an operation receiver that receives a user operation on the operation panel 25 and (ii) a display controller that displays various screens on the operation panel 25. The user may change the set value of the item from the setting change screen displayed on the operation panel 25 as described above. The user interface processor 11 acquires a name of one or plural items whose set values have been changed and changed set values. The set value that has been changed by the user is saved as a preset setting. The file name creation processor 12 creates a file name for saving the set value as the preset setting such that the file name includes a character string representing the name of the item whose set value has been changed and the changed set value.

The function information storage 13 stores item information in which (i) items that may be set for various functions provided by the image forming apparatus 2 and (ii) item values that may be set for the items or a range of the item values are defined.

The preset setting information storage 14 stores preset setting information including the preset setting described above. The file name when the preset setting is saved is created by the file name creation processor 12 as described above.

Each of the components 11 and 12 in the information processing device 1 is implemented by a cooperative operation of a computer constituting the information processing device 1 and a program operated by the CPU 21 mounted on the computer. The storages 13 and 14 are implemented by the HDD 24 mounted in the information processing device 1. Alternatively, the RAM 23 or an external storage may be used via the network.

The program used in the present exemplary embodiment may be provided by a communication unit, or may be provided by being stored in a computer-readable recording medium such as a CD-ROM or a USB memory. The program provided from the communication unit or the recording medium is installed in a computer, and the CPU of the computer sequentially executes the program to implement various processing.

When a set value of an item in the image processing function (copy function in the above example) has been changed by the user, if the file name of the preset setting is created such that the file name includes a character string representing the set value that has been changed by the user, it is easy to understand characteristics of the preset setting without opening a file and checking contents of the file. For example, when the user sets duplex printing as the item value, if a character string such as "duplex" is included in the file name, it is possible to understand that the duplex printing is set in the preset setting without opening the file. Therefore, the initial value of the file name for saving the preset setting is created such that the initial value includes the character string representing (i) the name (hereinafter, "item name") of the item whose set value has been changed and (ii) the set value thereof, and is presented to the user. The user may adopt the initial value of the presented file name as it is as the file name of the preset setting, or may change the name to a desired file name. When the file name is to be changed, in the present exemplary embodiment, instead of editing the character string constituting the file name, a button indicating the item and the set value is displayed, so as to allow the user to edit the file name by operating the button.

Next, an operation of the present exemplary embodiment will be described. In the present exemplary embodiment, a case will be described as an example in which a file name for saving the preset setting for the copy function is created.

Figure 3:
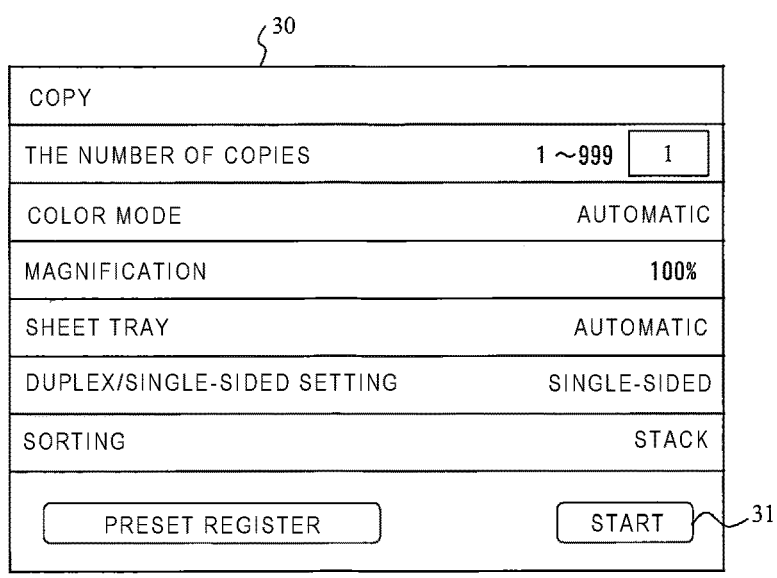
FIG. 3 is a diagram showing a display example of a setting change screen according to the present exemplary embodiment.

FIG. 3 is a diagram showing an example of a screen that displays a list of items and item values that may be set in the copy function. The screen corresponds to a setting change screen 30 in the present exemplary embodiment. When the user selects the copy function from, for example, a main screen (not shown), the user interface processor 11 displays the setting change screen 30 for the copy function shown in FIG. 3 on the operation panel 25.

In FIG. 3, "the number of copies", "color mode", "magnification", and the like that are arranged in a vertical direction on a left side of the drawing correspond to items. In addition, "1", "automatic", "100%", and the like that are arranged in the vertical direction on a right side of the drawing and are each displayed corresponding to a respective one of the items correspond to the set values set in the items. The set values displayed when the copy function is started are the initial values. Here, when the user wants to copy with the initial values without changing the set values, the user may simply select a start button 31.

Here, FIG. 4A shows an example of the setting change screen 30 when set values for some items have been changed. FIG. 4A shows an example in which the set values of three items of "sheet tray", "duplex/single-sided setting", and "sorting" have been changed by the user. FIG. 4A shows that the user changes the set values for the items in an order of changing the "duplex/single-sided setting" to "duplex" (step S1), changing the "sorting" to "sort" (step S2), and then changing the "sheet tray" to "tray 1" (step S3).

Here, when the user selects a preset register button 32, the file name creation processor 12 causes the operation panel 25 to display a file name setting screen 40 shown in FIG. 4B in order to save the preset setting. Specifically, although the user interface processor 11 may display the file name setting screen 40 on the operation panel 25 according to an instruction from the file name creation processor 12, in the present exemplary embodiment, the file name creation processor 12 displays a screen for simplification of description.

As shown in FIG. 4B, (i) an item whose set value has been changed on the setting change screen 30 and (ii) the set value of the item are extracted and displayed on the file name setting screen 40. Corresponding to FIG. 4A, the file name creation processor 12 extracts and displays (a) a set of the item "duplex/single-sided setting" and its set value "duplex", (b) a set of the item "sorting" and its set value "sort", and (c) a set of the item "sheet tray" and its set value "tray 1". At this time, the file name creation processor 12 displays the respective items in a button format. For convenience, in FIG. 4B, reference numerals are simply allocated to item buttons corresponding to the item "duplex/single-sided setting". For example, in a case of the item "duplex/single-sided setting", the name of the item "duplex/single-sided setting" and the set value "duplex" are displayed as a set in an item button 41. For the item, an item name button 42 that displays the name of the item therein is displayed. Then, delete buttons 43 and 44 are displayed corresponding to the item button 41 and the item name button 42, respectively. As shown in FIG. 4B, in the present exemplary embodiment, the delete buttons 43 and 44 are respectively formed in upper right corners of the buttons 41 and 42 in a shape represented by "x", but shapes and display positions of the delete buttons 43 and 44 are not limited thereto.

Since the user changes the set values in the order of the "duplex/single-sided setting", the "sorting", and the "sheet tray" as described with reference to FIG. 4A, the file name creation processor 12 arranges and displays, on the file name setting screen 40, item buttons 41 corresponding to the items according to the order in which the user performs a change operation for the set values. On the file name setting screen 40, the item buttons 41 are arranged in order from an upper left of a display region in a lateral direction and then downward due to a line break.

When the preset setting is registered in the arrangement order of the item buttons 41, the user selects a register button 45. When the user wants to stop the registration of the preset setting, the user selects a cancel button 46. In this case, display control may be performed such that the setting change screen 30 shown in FIG. 3 is displayed on the operation panel 25. An add button 47 will be described later.

FIG. 4C shows a file name that is created when the user selects the register button 45 in a state where the item buttons 41 are displayed side by side as shown in FIG. 4B. As shown in FIG. 4C, the file name is created according to the arrangement order of the item buttons 41 on the file name setting screen 40. The user may know the items whose set values have been changed from the initial values and the changed set values by simply referring to the file name without opening the file in which the preset setting is recorded.

Subsequently, FIG. 5A is a diagram showing a display example when the set values for some items have been changed in an order different from that in FIG. 4A. FIG. 5A shows that the user changes the set values for the items in an order of changing the "duplex/single-sided setting" to "duplex" (step S1), changing the "sorting" to "sort" (step S2), and then changing the "magnification" to "70%" (step S3).

Here, when the user selects the preset register button 32, the file name creation processor 12 causes the operation panel 25 to display the file name setting screen 40 shown in FIG. 5B in order to save the preset setting.

On the file name setting screen 40, as in FIG. 4B, items whose set values have been changed on the setting change screen 30 and the set values of the items are extracted and displayed. It is noted that different from that in FIG. 4B, the file name creation processor 12 arranges the item buttons 41 of the items on the file name setting screen 40 according to an order in which the items whose set values have been changed are arranged on the setting change screen 30.

According to a display screen example shown in FIG. 5B, the item buttons 41 are arranged in an order of the item "magnification", the item "duplex/single-sided setting", and the item "sorting". Referring to the function information storage 13, there are relatively many candidates for the set value that may be set in the item "magnification", such as 10%, 20%, and any other options. There are two candidates for the set value of the item "duplex/single-sided setting", that is, single-sided and duplex. There are two candidates for the set value of the item "sorting", that is, stack and sort. As a result, the item "magnification", which has the most candidates for the set value, has the highest priority among the items whose set values have been changed, and is positioned at a beginning of the arrangement of the items. The item "duplex/single-sided setting" and the item "sorting" both have two candidates for a set value. Thus, in this case, as described with reference to FIGS. 4A and 4B, the item "duplex/single-sided setting" for which a setting change operation has been performed first is preferentially included in the file name.

FIG. 5C shows the file name created when the user selects the register button 45 in a state where the item buttons 41 are displayed side by side as shown in FIG. 5B. As shown in FIG. 5C, in the file name, the item names and the set values thereof are arranged in an order from the item having the most candidates for the set value and the set value of the item. When the numbers of candidates for the set values are the same, the items and the set values thereof are arranged and created in an order in which the change operation of the set value has been performed by the user.

Subsequently, FIG. 6A is a diagram showing a display example when the set values for some items have been changed in an order different from those in FIGS. 4A and 5A. FIG. 6A shows that the user changes the set values for the items in an order of changing the "magnification" to "70%" (step S1), changing the "color mode" to "color" (step S2), and then changing "the number of copies" to "5" (step S3).

Here, when the user selects the preset register button 32, the file name creation processor 12 causes the operation panel 25 to display the file name setting screen 40 shown in FIG. 6B in order to save the preset setting.

On the file name setting screen 40, as in FIGS. 4B and 5B, items whose set values have been changed on the setting change screen 30 and the set values of the items are extracted and displayed. It is noted that different from that in FIGS. 4B and 5B, the file name creation processor 12 arranges the item buttons 41 of the items on the file name setting screen 40 according to an order in which the items whose set values have been changed are arranged on the setting change screen 30.

According to a display screen example shown in FIG. 6B, the items "the number of copies", "color mode", and "magnification", and the items whose set values have been changed are arranged according to an arrangement order on the setting change screen 30. That is, an order in which the user changes the set values of the items is not referred to. For example, when the items displayed on the setting change screen 30 are arranged in a descending order of priority, the items and the set values thereof are arranged in the descending order of priority and included in the file name.

FIG. 6C shows the file name created when the user selects the register button 45 in a state where the item buttons 41 are displayed side by side as shown in FIG. 6B. As shown in FIG. 6C, the file name is different from that in FIG. 4C. The items are arranged according to the arrangement order on the setting change screen 30 instead of the order in which the user performs the setting change operation.

In the present exemplary embodiment, as described with reference to FIGS. 4A to 6C, the item value in which the set value has actually been changed by the user is extracted from the item whose set value may be changed, and the file name of the file including a preset setting content may be created. The created file name corresponds to the initial value of the file name of the file including the preset contents. The user may change the initial value of the file name by operating the button as follows.

FIG. 7A is a diagram showing a display example of the file name setting screen 40, and is the same drawing as FIG. 4B. Here, it is assumed that the user performs a predetermined delete operation. Specifically, it is assumed that a delete button 44a corresponding to an item name button 42a of the item "duplex/single-sided setting" and a delete button 43b corresponding to an item button 41b of the item "sorting" are operated. For an order of the operations, either of the operations may be performed first. FIG. 7B shows a display example of the file name setting screen 40 after the delete operation. Suffixes (a, b, and the like) will be appropriately omitted when the buttons are described without distinction.

The delete button 44a corresponding to the item name button 42a is operated as in the display example of the file name setting screen 40 shown in FIG. 7B, so that the item name "duplex/single-sided setting" is deleted from the item button 41a, and only the item value "duplex" remains. The delete button 43b is operated, so that the item button 41b of the item "sorting" is deleted.

FIG. 7C shows the file name created when the user selects the register button 45 in a state where the item buttons 41 are displayed side by side as shown in FIG. 7B. As shown in FIG. 7C, for the item "duplex/single-sided setting" included in the file name, the item name "duplex/single-sided setting" is deleted, and only the item value "duplex" remains. The information about the item "sorting", that is, a set of the item name "sorting" and the set value thereof "sort" is deleted. In the item button 41a in which the item name has been deleted, a restore button 48 is added and displayed. How to use the restore button 48 will be described later. A shape of the restore button 48 and a position where the item button 41 is to be added that are shown in FIG. 7B are a mere example. The present disclosure is not limited to this example.

For example, there is an item for which the user may be able to specify a type simply from the item value, such as relation between the item "duplex/single-sided setting" and the item value "duplex". In this case, it is not necessary to include the item name in the file name. When the user does not want to include the item name in the file name, the item name "duplex/single-sided setting" may be omitted, which makes it possible to shorten the file name. For example, the user may be able to guess a set value of an item even if neither the item name nor the set value is included in a file name. For example, when "sort" is set for the item "sorting" in all preset settings to be created, the user may be able to guess the set value "sort". In this case, it is not necessary to include the set value in the file name. When the user does not want to include the set value in the file name, information about the item may be omitted, which makes it possible to shorten the file name.

FIG. 8A is a diagram showing a display example of the file name setting screen 40, and is the same drawing as FIG. 7B. Here, it is assumed that the user performs a predetermined move operation. For example, when the item button 41a is dragged and dropped to a position after an item button 41c as shown by a broken line shown in FIG. 8A, the item button 41c moves to the beginning of the arranged item buttons 41 as the item button 41a moves, and the item button 41a is displayed at a position following the item button 41c as shown in FIG. 8B.

FIG. 8C shows the file name created when the user selects the register button 45 in a state where the item buttons 41 are displayed side by side as shown in FIG. 8B. As shown in FIG. 8C, the character string "duplex" indicating the item value moves to a position after the set of the item name "sorting" and the set value thereof "sort". Thus, the user may change the arrangement order of the items after the set values are changed.

FIG. 9A is a diagram showing a display example of the file name setting screen 40, and is the same drawing as FIG. 8B. Here, the user performs a predetermined restore operation for the item button 41a, that is, selects a restore button 48a shown in FIG. 9A. In response to the restore operation, the file name creation processor 12 restores an original state such that the item name button 42a corresponding to the deleted item name is displayed on the item button 41a as shown in FIG. 9B.

FIG. 9C shows the file name created when the user selects the register button 45 in a state where the item buttons 41 are displayed side by side as shown in FIG. 9B. As shown in FIG. 9C, the item name for the item "duplex/single-sided setting" is restored in the character string indicating the file name.

FIG. 10A is a diagram showing a display example of the file name setting screen 40, and is the same drawing as FIG. 9B. Here, when the user performs a predetermined display operation, that is, an operation of selecting the add button 47 shown in FIG. 10A, in response to the display operation, the file name creation processor 12 displays, on the file name setting screen 40 in a superimposed manner, an item addition screen 49 for displaying an item and a set value that are on the setting change screen 30 but are not on the file name setting screen 40.

Here, it is assumed that the user selects the item "magnification" (step S1), and further selects the item "sorting" from the item addition screen 49 (step S2). FIG. 10B shows a display example of the file name setting screen 40 displayed after a select operation. As shown in FIG. 10B, the file name creation processor 12 adds and displays item buttons 41d and 41e of the items "magnification" and "sorting", which are selected on the item addition screen 49, on the file name setting screen 40.

FIG. 10C shows the file name created when the user selects the register button 45 in a state where the item buttons 41 are displayed side by side as shown in FIG. 10B. As shown in FIG. 10C, the items "magnification" and "sorting" and the set values for the items "magnification" and "sorting" are added. When the user wants to change the arrangement order of the items, the user may perform a predetermined move operation as described with reference to FIG. 8A.

Figure 11A:
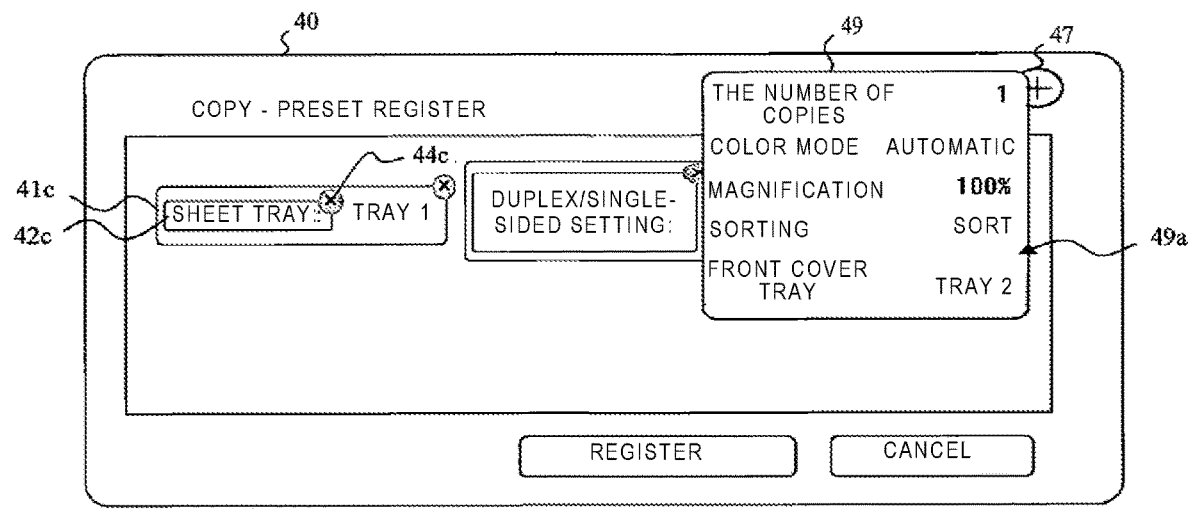
FIG. 11A is a diagram showing another display example of the item addition screen according to the present exemplary embodiment.
Figure 11B:
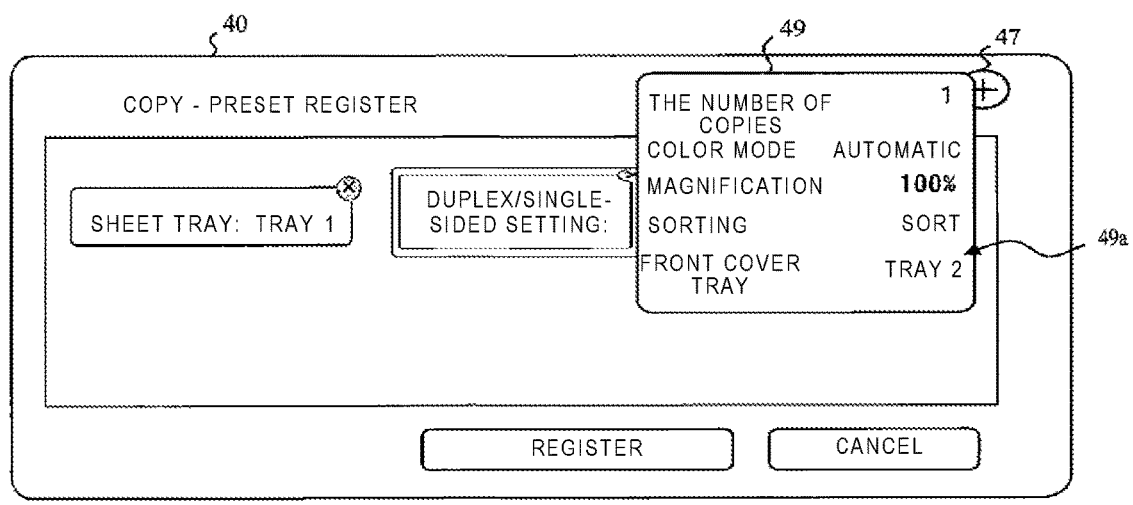
FIG. 11B is a diagram showing a display example of the file name setting screen before an item is added from the item addition screen shown in FIG. 11A.

FIG. 11A is a diagram showing a display example of the file name setting screen 40. FIG. 11A shows a state in which the item addition screen 49 is displayed on the file name setting screen 40 in the superimposed manner in response to the user selecting the add button 47 as in FIG. 10A. In FIG. 11A, an item "front cover tray" is included in the item addition screen 49. Referring to function information, "tray 2" may be set for the item "front cover tray" as the set value. FIG. 11A shows a state in which the "tray 2" is set as the set value.

Here, it is assumed that the item name has been deleted from the item button 41c by the user selecting a delete button 44c associated with an item name button 42c of the item "sheet tray". In this case, only the set value "tray 1" is displayed on the item button 41c, such as "duplex" shown in FIG. 7B. Then, it is unclear what item the item button 41c on which only the set value "tray 1" is displayed corresponds to. More specifically, it may not be possible to specify whether the item button on which only the set value "tray 1" is displayed is the item button corresponding to the item "front cover tray" or the item button corresponding to the item "sheet tray".

Therefore, in the present exemplary embodiment, for the item button corresponding to the item (for example, the above "sheet tray" and "front cover tray") whose item name may not be uniquely specified based on the set value (for example, the above "tray 1" and "tray 2"), the item name button and the delete button associated with the item name button are not displayed, and the item name is prevented from being deleted from the item button, so as to avoid the above issue. In other words, the item button including only the set value is not created.

In the present exemplary embodiment, no delete button is displayed in association with the item name button of the item whose item name is not to be deleted. Alternatively, the delete button may still be displayed. It is noted that in this case, it is necessary to perform processing internally such that the item name button is not deleted even if the delete button is selected by the user.

Figure 12A:
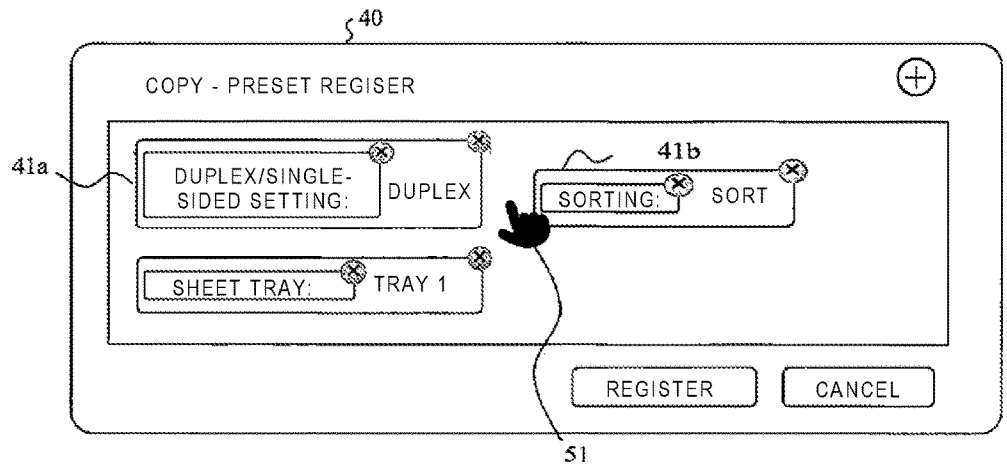
FIG. 12A is a diagram showing a display example of the file name setting screen according to the present exemplary embodiment.

FIG. 12A is a diagram showing a display example of the file name setting screen 40, and is the same drawing as FIG. 4B. Here, it is assumed that the user performs a predetermined operation of adding a display element at a position where the item button 41 is not displayed on the file name setting screen 40. In the present exemplary embodiment, a touch operation for the operation panel 25 is assumed as the predetermined operation of adding a display element. As shown in FIG. 12A, it is assumed that the user touches a position between the item button 41a and the item button 41b with a finger 51.

Figure 12B:
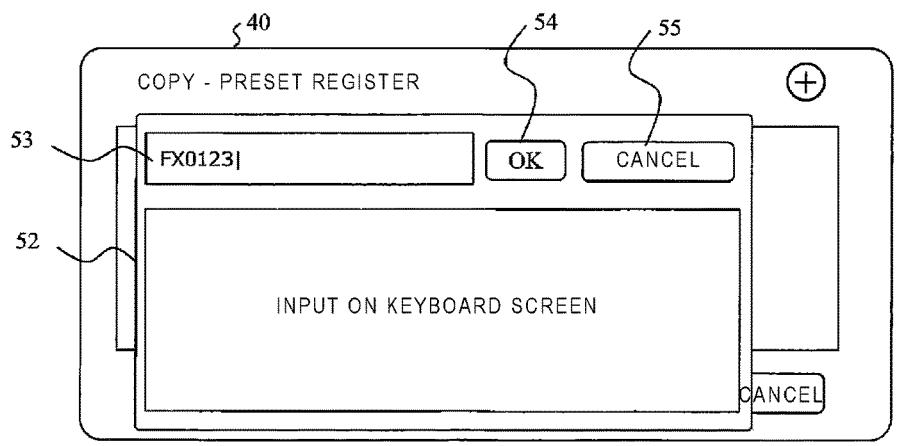
FIG. 12B is a diagram showing a display example of a character string input screen that is displayed after a user performs a touch operation on the file name setting screen shown in FIG. 12A.
Figure 12C:
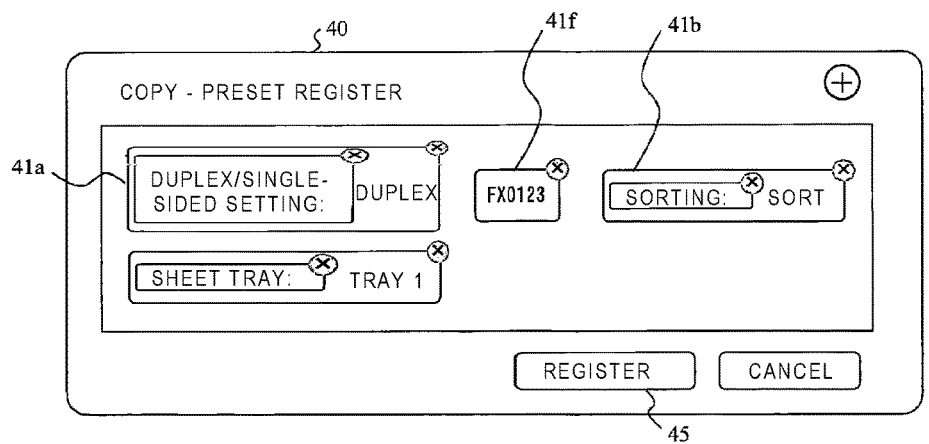
FIG. 12C is a diagram showing a display example of the file name setting screen after the user inputs a character string on the character string input screen shown in FIG. 12B.

In response to the touch operation on the file name setting screen 40, the file name creation processor 12 displays a character string input screen 52 on the file name setting screen 40 in a superimposed manner as shown in FIG. 12B. When the user inputs a desired character string in a character string input field 53 on the character string input screen 52 and selects an OK button 54, the character string input screen 52 disappears, and the file name setting screen 40 appears on the operation panel 25. FIG. 12C shows a display example of the file name setting screen 40 at this time.

As shown in FIG. 12C, an item button 41f is newly added and displayed at an operation position touched by the user, that is, between the item button 41a and the item button 41b. The character string input by the user is displayed on the item button 41f.

FIG. 12D shows the file name created when the user selects the register button 45 in a state where the item buttons 41 are displayed side by side as shown in FIG. 12C. As shown in FIG. 12D, the file name creation processor 12 adds the character string input from the character string input screen 52 at a position corresponding to positional relation with the item buttons displayed on the file name setting screen 40.

As is apparent from the above description, the position at which the user touches the file name setting screen 40 may be a start position or a last position in an arrangement of the item buttons, or between the item buttons as shown above.

In order to cause the character string input screen 52 to disappear from the operation panel 25, a cancel button 55 may be selected.

FIG. 13 is a diagram showing another display example of the file name setting screen 40. In the above description, as shown in the item "duplex/single-sided setting", basically, the item button 41*a* is provided for each item, the item name button 42*a* that displays the item name is provided on the item button 41*a,* and the delete buttons 43*a* and 44*a* are displayed in association with the buttons 41*a* and 42*a*. In some cases, it may be desired that an important item is always included in the file name without being deleted.

Therefore, as shown in item buttons 41*g* and 41*h,* for important items (in this example, "the number of copies" and the "magnification"), the file name creation processor 12 displays no delete button in association with the item buttons 41*g* and 41*h* such that none of the item buttons are deleted, in other words, the file name includes at least the set values of the items. Flag information indicating whether each item is important is set in the function information stored in the function information storage 13. The file name creation processor 12 may determine whether an item to be displayed on the file name setting screen 40 is important by referring to the function information.

In the present exemplary embodiment, no delete button is displayed in association with the item button of the item that is not to be deleted. Alternatively, the delete button may remain displayed. In this case, it is necessary to perform processing internally such that the item button is not deleted even if the delete button is selected by the user.

FIG. 14 is a diagram showing another display example of the file name setting screen 40. In each display example of the file name setting screen 40 described above, the file name created according to the setting of the file name setting screen 40 is not shown. Therefore, in the present exemplary embodiment, in order to understand the file name that will be created when the register button 45 is selected on the file name setting screen 40 shown in FIGS. 4B to 10B, the file name is displayed in FIGS. 4C to 10C for reference.

In the file name setting screen 40 shown in FIG. 14, before the user make an instruction to create a file name, that is, before the user selects the register button 45, a file name display region 56 is provided that displays a file name that will be created according to the arrangement order of the item buttons displayed on the file name setting screen 40.

Therefore, each time the user operates any of the buttons in a button operation region 40*a,* the file name creation processor 12 creates a file name according to the arrangement order of the item buttons in which contents of the operation are reflected, and displays the file name in the file name display region 56. Since the created file name may be the same as that in FIGS. 4C to 10C, a description thereof is omitted.

As described above, according to the present exemplary embodiment, when the file name of the file saving the preset setting is created, the file name is edited by performing an operation on the button instead of inputting the character string indicating the item name, the set value, or the like, the user may easily edit the file name.

In the present exemplary embodiment, a set of (i) the item whose set value has been changed on the setting change screen 30 and (ii) the set value of the item is displayed on the file name setting screen 40 as a display element called a button. It is noted that the display element is not necessarily limited to a button shape. Other forms of display elements may be used.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to:
    acquire: (i) names of items whose set values have been changed from a setting change screen; and (ii) changed set values of the items;
    arrange and display, on a file name setting screen, which is different from the setting change screen, one or more user-operable elements, each corresponding to a respective one of the items whose set values have been changed, the elements being arranged and displayed according to an order in which a user performed a change operation to change the set values of the items;
    in response to a user instruction, create a file name that includes: (i) a name of at least one of the items; and (ii) the set value of the at least one of the items,
wherein the file name is created in accordance with an arranged order of the elements displayed on the file name setting screen; and
    before receiving the user instruction to create the file name, display a preview of the file name that will be created according to the arranged order of the elements displayed on file name setting screen.

2. The information processing device according to claim 1, wherein the order of the items on the setting change screen is changeable by a user operation.

3. The information processing device according to claim 1, wherein the processor is configured to change the order of the displayed elements on the file name setting screen in response to a user operation being performed on the displayed one or more elements.

4. The information processing device according to claim 1, wherein each of the elements displays the name of the respective corresponding item and the set value of the respective corresponding item, and the processor is configured to, in response to a predetermined first user operation being performed for a user-selected element of the displayed elements, delete the name of the item displayed on the selected element.

5. The information processing device according to claim 4, wherein the processor is configured to, in response to a predetermined second user operation being performed for the element from which the name of the item has been deleted, redisplay the deleted name on the element.

6. The information processing device according to claim 4, wherein the processor is configured to, if the first predetermined user operation is performed for an element corresponding to an item whose name cannot be uniquely specified from an item value of the item, not delete the name of the item displayed on the element.

7. The information processing device according to claim 1, wherein the processor is configured to, in response to a first predetermined user operation being performed for a user-selected element of the one or more displayed elements, delete the selected element from the file name setting screen.

8. The information processing device according to claim 7, wherein the processor is configured to, if the first predetermined user operation is performed for an element corresponding to an important item, not delete the element from the file name setting screen.

9. The information processing device according to claim 1, wherein the processor is configured to:
  in response to a predetermined user operation, display an item addition screen that displays: (i) items which are on the setting change screen but not on the file name setting screen; and (ii) set values thereof;
  acquire: (i) a name of each item whose set value has been changed from the item addition screen; and (ii) changed set values thereof; and
  add, to the file name setting screen, a user-operable element corresponding to the item whose set value has been changed from the item addition screen.

10. The information processing device according to claim 1, wherein the processor is configured to:
  in response to a predetermined user operation being performed on the file name setting screen, prompt a user input of a character string; and
  add, to the file name setting screen, an element that displays the user-input character string.

11. The information processing device according to claim 10, wherein the processor is configured to, when adding the element that displays the user-input character string to the file name setting screen, add the element at a position where the predetermined operation has been performed.

12. A non-transitory computer readable medium storing a program that causes a computer to execute information processing, the information processing comprising:
  acquiring: (i) names of items whose set values have been changed from a setting change screen; and (ii) changed set values of the items;
  arranging and displaying, on a file name setting screen, which is different from the setting change screen, one or more user-operable elements, each corresponding to a respective one of the items whose set values have been changed, the elements being arranged and displayed according to an order in which a user performed a change operation to change the set values of the items;
  in response to a user instruction, creating a file name that includes: (i) a name of at least one of the items; and (ii) the set value of the at least one of the items,
  wherein the file name is created in accordance with an arranged order of the elements displayed on the file name setting screen; and
  before receiving the user instruction to create the file name, displaying a preview of the file name that will be created according to the arranged order of the elements displayed on file name setting screen.

13. An information processing device comprising:
  means for acquiring: (i) names of items whose set values have been changed from a setting change screen; and (ii) changed set values of the items;
  means for arranging and displaying, on a file name setting screen, which is different from the setting change screen, one or more user-operable elements, each corresponding to a respective one of the items whose set values have been changed, the elements being arranged and displayed according to an order in which a user performed a change operation to change the set values of the items;
  means for, in response to a user instruction, creating a file name that includes: (i) a name of at least one of the items; and (ii) the set value of the at least one of the items,
  wherein the file name is created in accordance with an arranged order of the elements displayed on the file name setting screen; and
  means for, before receiving the user instruction to create the file name, displaying a preview of the file name that will be created according to the arranged order of the elements displayed on file name setting screen.

* * * * *